Patented Oct. 16, 1951

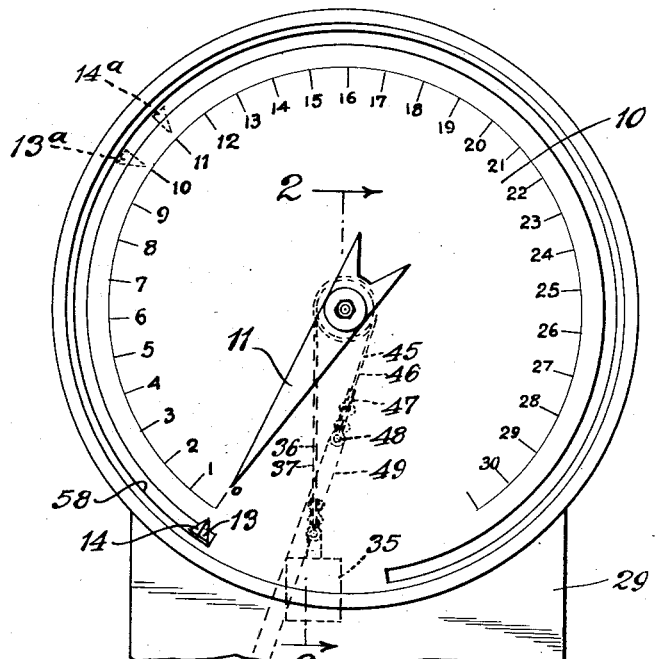

2,571,414

UNITED STATES PATENT OFFICE 2,571,414

REGISTERING MECHANISM FOR SCALES
AND THE LIKE

Andrew G. Brown, Maywood, Ill., assignor to The
Griffith Laboratories, Inc., Chicago, Ill., a corporation of Illinois Application June 24, 1947, Serial No. 756,637

5 Claims. (Cl. 116—129)

The present invention relates generally to rotary indicating devices, and in particular to a counterbalanced drum forming part of an indicating or registering mechanism, as in weighing scales.

In many indicating devices it is common to have an indicator or registering needle axially rigid with a rotary drum. The drum is actuated into rotary movement by means of a tension member secured to and unwinding or winding on its surface. Winding or unwinding in the reverse direction on said drum is another means secured to the drum and in tension by reason of a counterbalancing weight suspended by said means. This sort of structure is most common in weighing scales, and in the remaining description, will be illustrated by reference to scales.

In weighing scales, the said counterbalancing weight frequently vibrates and the swinging motion thereof affects the registration of the device, especially by prolonging the period necessary for the parts to come to rest. Particularly in cases where the use of the scale gives impacts to the mechanism, such use initiates the undesired swinging movement of the counterbalancing weight. The present invention is directed primarily to overcoming the tendency of such a counterbalancing weight to swing.

It is the general object of the invention to provide a counterbalancing weight for a rotary drum with two spaced tension members suspending the weight from the drum.

It is a particular object to provide two spaced tension members suspending a counterbalancing weight from a drum, and to place each suspension member at the same angle from the vertical.

It is also an object of the invention to have the pulling and the counterbalancing tension members on the drum, so constructed and arranged that the drum is free from end-thrust.

Numerous other objects and advantages of the invention will be apparent from the following description and explanation of the invention as it is practiced in its preferred embodiment in weighing scales, as described in the accompanying drawings in which:

Fig. 1 is a face view of a registering dial, particularly adapted for a scale designed for pickling hams.

Fig. 2 is a detailed and enlarged view in vertical cross-section taken on the line 2—2 of Fig. 1.

Fig. 3 is a detailed view in horizontal cross-section taken on the line 3—3 of Fig. 2.

In pickling hams it is well known to provide a weighing scale having a conventional type of weight indicating needle, and in association with the dial of such scale to have two relatively movable percentage indicators. These indicators are movable toward and away from each other, and are so connected by mechanism that when one indicator registers a given weight on the dial, the other indicator registers some predetermined increased percentage of the indicated weight. The percentage is fixed by the mechanism or is adjustably fixed where the mechanism so permits. Thus, in operation of a pickling scale, a ham is placed on the platform, causing the weight needle to come to rest at a point corresponding to the weight of the ham. Percentage indicators are then moved manually so that the lower registering one also registers the weight of the ham, whereby the other indicator registers a given per cent in addition, such as 10% where a 10% addition of pickling brine is in order. Then pickling brine is pumped into the ham until the weight needle moves to the increased percentage indicator.

In such a use of pickling scales in a packing plant, the scale receives considerable abuse in the constant placing of hams thereon. Speed of production is an essential element of the procedure, and insofar as the scale is tardy in coming to rest, speed of production is decreased. One of the elements responsible for this tardiness, is the counterbalancing weight found on drums in certain types of scales.

Therefore, in the accompanying drawings the invention is illustrated in connection with a portion of the percentage mechanism, which however forms no part of the invention of the present application. A suitable mechanism is described in my copending application, Ser. No. 756,638, filed June 24, 1947.

The numeral 10 indicates a circular dial of a scale calibrated in equal weight units. Numeral 11 is a weight-indicating needle for the dial 10. In Fig. 2 a glass covering, not readily indicated in Fig. 1, is designated by the numeral 12. Numerals 13 and 14 represent percentage indicators in the form of triangular pointers which are movable concentrically with the needle 11, and which move toward and away from each other as above described. The pointers 13 and 14 are shown positioned together at zero on the scale, and in dotted-line positions 13$^a$ and 14$^a$ they register 10 lbs. for a ham-weight and 11 pounds for a pickled-ham weight.

In Fig. 2 there is shown a drum 15 which is rotatable on a horizontal axis and mounted in ball-bearing supports. Fig. 3 shows some detail of mounting the drum. The drum is rigid on horizontal shaft 16 which at the rear is reduced in diameter as shown at 17, forming an annular runway for bearing balls 18 within a bearing collar 19 which is adjustably threaded into a plate 20 mounted within and close to rear casing wall 21. At the forward end, the drum axle 16 is enlarged as shown at 25, and forward thereof, is of reduced diameter at 26 forming an annular runway for bearing balls 27 in cooperation with the inner wall of the annular collar 28 secured to front wall 29 of the casing. The dial plate 10 is shown as mounted on said front wall 29. The drum axle 16 extends forwardly through openings 31 in both the front wall 29 and dial 10, to provide a projecting threaded portion 32 onto which pointer 11 is secured by nut 33 over washer 34.

In Fig. 2 there is shown actuating means, later described, which is wound onto the drum 15 and is pulled to turn the drum in one direction and relaxed against counterbalancing means on the drum to turn it in the other direction, thus to register the true weight on the circular dial 10.

The counterbalancing means is a weight 35 suspended by two spaced suspension means, preferably metal ribbons 36 and 37, secured respectively by screws 38 and 39 to the drum. The tapes 36 and 37 wind onto the drum 15 in one direction under a positive winding action by the drum. The ribbons 36 and 37 are spaced apart at the drum in all positions of winding, in accordance with the present invention, thereby to minimize swinging of the weight 35, which would be greatly amplified were there but a single cord suspension from weight 35 to drum 15. It is preferred that the tapes 36 and 37 be non-parallel, and that their vertical stretches taper downwardly a sufficient degree to cause them to wind spirally on the drum 15 without overlap. Preferably, both tapes 36 and 37 are at equal angles with the vertical, to keep the lengths the same as the drum turns, and also to neutralize their two opposite end-thrusts. Not only does the downward tapering lead to this desirable winding condition, but it also adds to the minimizing of swinging. The greater the angle between the ribbons 36 and 37, the greater is the effect of minimizing vibration in the plane of said tapes. The bottom ends of the tapes are fixedly connected to a plate 41, as by rivets 42 to fix the angle. The plate 41 has downwardly projecting bifurcations 43 carrying a pivot such as cotter pin 44 on which weight 35 exerts its downward pull.

It is customary in counterbalanced drums to use a single tape for suspending the weight, and a second single tape winding in the other direction to actuate the drum and wind on the weight-tape. These two tapes are so arranged that each neutralizes the end-thrust produced by the other. But when the present invention to minimize swinging of the counterweight is so employed as to create no end-thrust, it becomes desirable likewise to employ a similar construction for the tension means which actuates the drum.

In Fig. 2 there are shown two metal tapes 45 and 46, which are spaced apart preferably at an angle, and secured to plate 47. Plate 47 is bifurcated and at the end carries a pivot in the form of a cotter pin 48, for a pivotally connected link 49 which has linear movement in proportion to the weight being registered. The tapes 45 and 46 are arranged like the tapes 36 and 37, being at equal angles with the vertical, and at an angle in conformity with their width to assure spiral winding on the drum 15 without overlap. Their ends are secured to the drum by screws 50 and 51. Thus, there are two sets of tapes on the drum winding in opposite directions, each set being in the shape of a V at an angle to neutralize end-thrusts.

The percentage mechanism has some of its parts associated with the mounting of the drum, as best shown in Fig. 3. On the bearing collar 28 bear two annular gears 53 and 54. They are axially fixed by spacer plates 55 and 56 functioning together with outward flange 57 integral with the collar 28. The gears 53 and 54 carry radial arms, not shown, which terminate in the percentage pointers 13 and 14 shown in Fig. 1. These pointers 13 and 14 ride in an arcuate slot 58 (Fig. 1) defined in part by edges of face plate 29 and dial 10.

The gears 53 and 54 are actuated by racks in the form of toothed links 60 and 61, which, on the back edges opposite their rack teeth, ride against small rollers 63 and 64, respectively, bearing on a pin 65 secured to a keeper arm 66 pivoted to the front casing wall 29 (Fig. 3).

From the foregoing it will be appreciated that the weight 35 is restrained from any uniform or prolonged swinging in the direction normal to the plane of the dial 10. However it is also clear that the weight 35 is free to swing in a direction parallel to the dial 10. However, such last-mentioned swinging is not a swinging as a pendulum of fixed length, because the suspending tapes 36 and 37 change the effective length of the resulting pendulum. Such swinging causes the tapes to shift their lines of contact with drum 15, thus to vary the pendulum's length. This change of length in the pendulum is, however, conventional, and its effect to arrest the swinging is well known. The present invention is highly effective to prevent a true pendulum action in a direction at right angles to the dial, and, as a result, the weight quickly comes to rest, and likewise the needle 11.

In like manner the two tapes 45 and 46 keep the link 49 in a fixed path, free from movement broadside in the direction of the drum's axis, and without end-thrust.

The invention is subject to numerous embodiments in modification of the form above described for illustrative purposes, and such changes and modifications are contemplated as falling within the scope of the invention as set forth in the appended claims.

I claim:

1. In an indicating device, a drum rotatable on a fixed horizontal axis, a weight suspended from the periphery of the drum and effective to urge the drum in one direction of rotation, two flexible suspending members each connected at one end to the weight and at the other end to the drum for winding thereon, said members being spaced apart throughout that extent which winds on the drum, a link member having linear movement to be translated into rotary movement of the drum, and two flexible connecting members spaced apart throughout their extents which wind on the drum, each connected at one end to said link member and at the other end to the drum for winding thereon in a direction opposite to said two flexible suspending members.

2. In an indicating device, a drum rotatable on a fixed horizontal axis, a weight suspended from the periphery of the drum and effective to urge the drum in one direction of rotation, two flexible suspending members each connected at one end to the weight and at the other end to the drum for winding thereon, said members being spaced apart throughout that extent which winds on the drum and at an angle to each other, a link member having linear movement to be translated into rotary movement of the drum, and two flexible connecting members spaced apart throughout their extents which wind on the drum and at an angle to each other, each connected at one end to said link member and at the other end to the drum for winding thereon in a direction opposite to said two flexible suspending members.

3. In an indicating device, a drum rotatable on a fixed horizontal axis, a weight suspended from the periphery of the drum and effective to urge the drum in one direction of rotation, two flexible suspending members each connected at one end to the weight and at the other end to the drum for winding thereon, said members being spaced apart throughout that extent which winds on the drum and at a downwardly tapering angle, a link member having linear movement to be translated into rotary movement of the drum, and two flexible connecting members spaced apart throughout their extents which wind on the drum and at a tapering angle from the drum, each connected at one end to said link member and at the other end to the drum for winding thereon in a direction opposite to said two flexible suspending members.

4. In an indicating device, a drum rotatable on a fixed horizontal axis, a weight suspended from the periphery of the drum and effective to urge the drum in one direction of rotation, two flexible suspending members each connected at one end to the weight and at the other end to the drum for winding thereon, said members being spaced apart throughout that extent which winds on the drum and at equal angles with the vertical for equal spiral winding on the drum, a link member having linear movement to be translated into rotary movement of the drum, and two flexible connecting members spaced apart throughout their extents which wind on the drum and at equal angles with the axis of the drum for spiral winding on the drum, each connected at one end to said link member and at the other end to the drum for winding thereon in a direction opposite to said two flexible suspending members.

5. In an indicating device, a drum rotatable on a fixed horizontal axis, two sets of tapes winding on the drum in opposite directions, each set consisting of two tapes arranged in the form of a symmetrical V winding on the drum, each tape of each set being at an angle to the axis of the drum to produce the same pitch of spiral winding without overlap, whereby each set produces self-neutralizing end-thrusts on the drum, and means acting to place each set in tension whereby movement of one set effects movements of the other.

ANDREW G. BROWN.

REFERENCES CITED

The following references are of record in the file of this patent:

UNITED STATES PATENTS

| Number | Name | Date |
|---|---|---|
| 1,015,561 | Hedman | Jan. 23, 1912 |